INVENTORS
CARL E. GRYCTKO
WILLIAM HAROLD EDMUNDS
BY
OSTROLENK, FABER, GERB & SOFFEN
ATTORNEYS

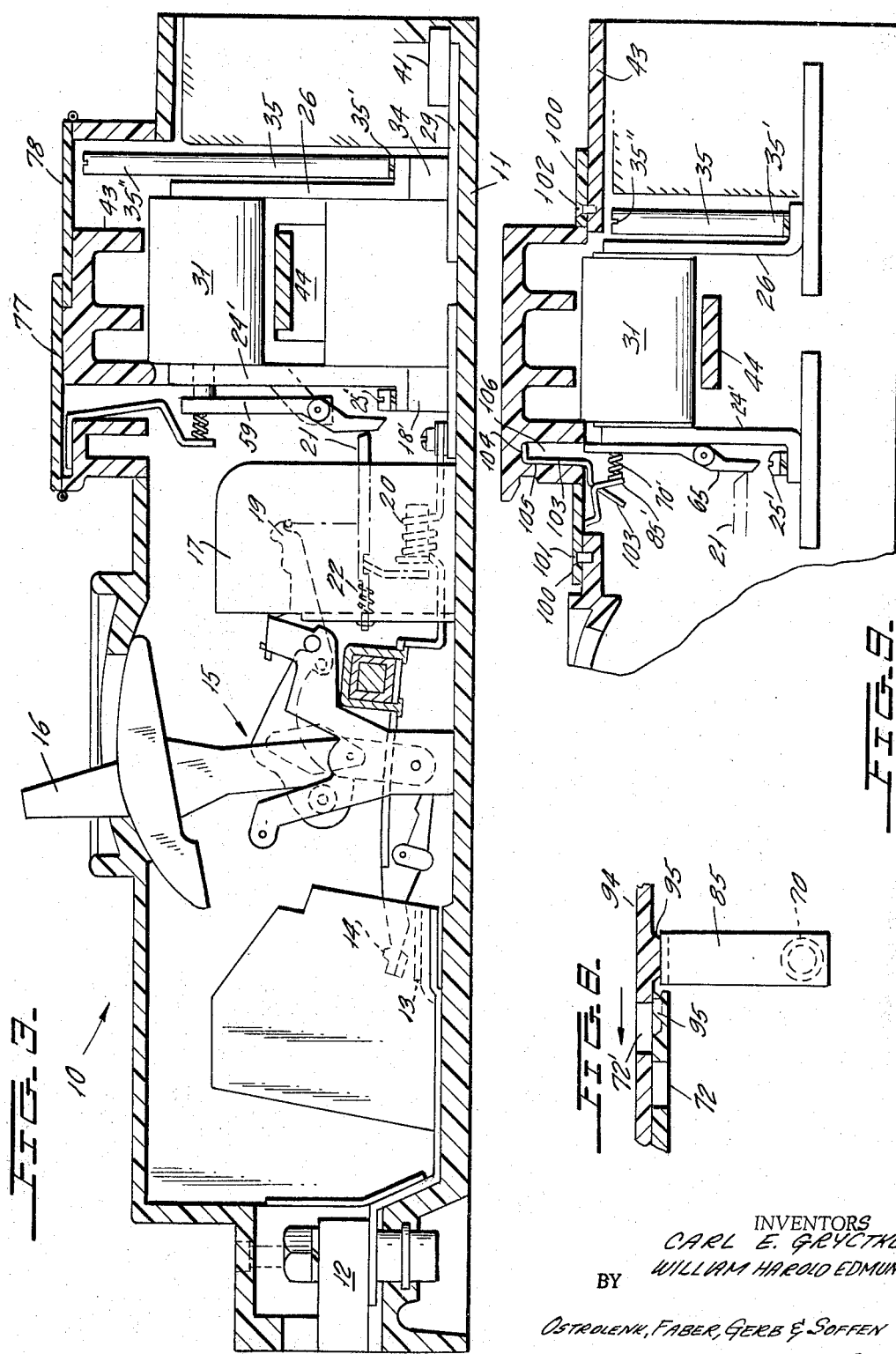

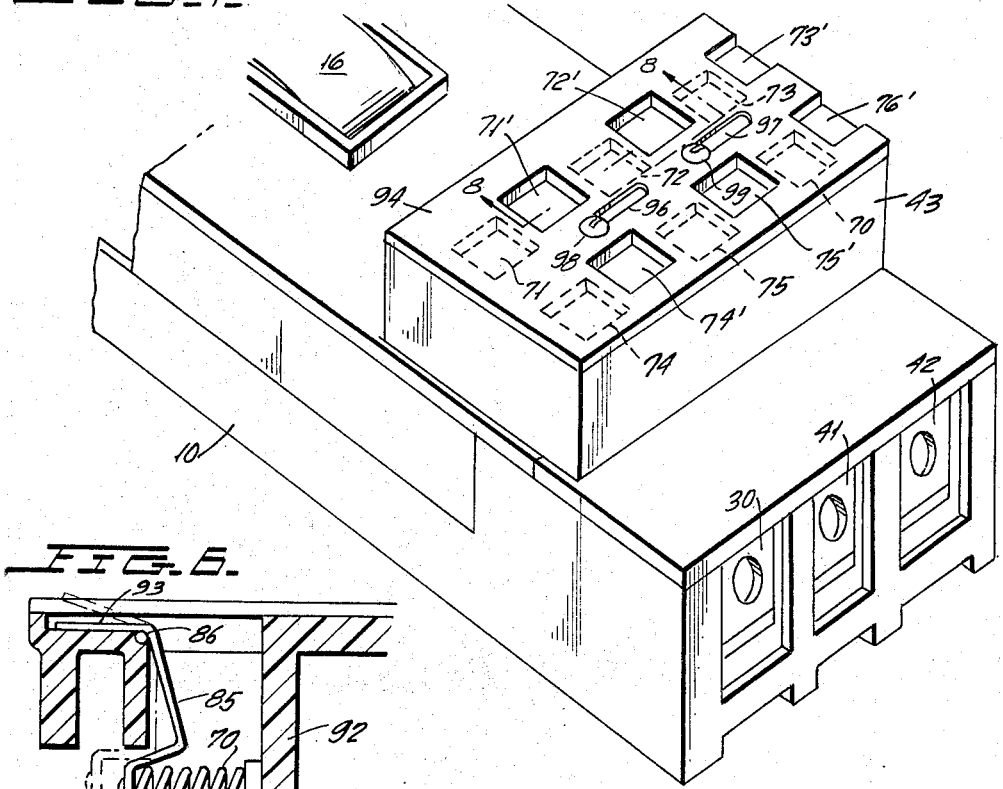

United States Patent Office 3,287,521
Patented Nov. 22, 1966

3,287,521
HOUSING AND INTERLOCK FOR BOLT CONNECTED CURRENT LIMITING FUSES
Carl E. Gryctko, Haddon Heights, N.J., and William Harold Edmunds, Bloomfield Hills, Mich., assignors to I-T-E Circuit Breaker Company, Philadelphia, Pa., a corporation of Pennsylvania
Filed Apr. 3, 1964, Ser. No. 357,138
13 Claims. (Cl. 200—114)

This invention relates to circuit intrrupters of the type having coordinated circuit breakers and current limiting fuses bolt-connected in series, and more particularly to a novel arrangement for providing external access to the connecting bolts, for the reception of a bolt tightening tool. Advantageously, such access is interlock connected within the separate fuse housing to maintain the necessary mechanical and electrical coordination between the fuse housing and the circuit breaker unit.

Circuit interrupters formed of electrically and mechanically coordinated circuit breakers and current limiting fuses are well known in the art, and are typically shown in U.S. Patent No. 2,924,688 issued February 9, 1960 in the name of William Harold Edmunds, entitled, "End Mounting of a Current Limiting Device Associated with a Circuit Breaker," and assigned to the assignee of the instant invention. In such arrangements the electrical and mechanical coordination between the current limiting fuse device and the circuit breaker enables the use of a circuit breaker having a relatively low interrupting capacity to be used in an electrical circuit having an available short circuit in excess of the interrupting capacity of the circuit breaker itself. For all magnitudes of overcurrent and fault current within the range capable of being interrupted by the circuit breaker, the trip characteristics are such that the time delay trip or the magnetic trip will initiate operation of the circuit breaker mechanism, such that the cooperating contacts of all poles thereof are moved to the disengagement position. However, should a severe short circuit occur, the magnitude of which may exceed the interrupting rating of the circuit breaker, the current limiting fuse will rupture, serving to interrupt the fault current associated with the phase in which it occurs. In order to prevent single phasing, mechanical coordination is provided whereby the rupture of any one of the current limiting fuse devices will result in the simultaneous opening of the cooperating contacts of each pole of the circuit breaker mechanism.

It has been found extremely advantageous to fasten the current limiting fuse devices into their own separate housing, with such fuse housing then being connected to the main housing of the circuit breaker; as, for example, in the manner shown in U.S. Patent No. 2,888,535, issued May 26, 1959 in the name of William Harold Edmunds, entitled, "Removable and Replaceable Current Limiter Housing for Circuit Breakers," and assigned to the assignee of the instant invention. In such an arrangement it is preferable for the current limiting fuse housing to be removable with respect to the circuit breaker housing, while providing an interlock between the two housings for causing circuit breaker operation responsive to removal of the current limiting fuse housing. However, when the two are connected, the electrical connections therebetween typically occur at a base region of the circuit breaker housing; this region being enclosed, and therefore obscured, by the fuse housing. Hence, because of the inaccessibility of this region, it had become the conventional practice to use a tulip-clip type of connection or similar easily releasable connection.

While this type of connection is quite convenient because of its inherent simplicity, it suffers from the disadvantage of not allowing very tight engagement of the electrical terminals to be connected thereby. That is, should excessive pressures be exerted, it would become extremely difficult if not impossible to mechanically pull the contacts apart or push them together. Hence, the contact resistance of this type of device is relatively high, and accordingly their application has been substantially limited to relatively low current ratings, as for example below 800 amperes.

In high current rating applications because of this high contact resistance, a substantial amount of heat will be generated at the contacts should a tulip or similar quick releasable type of connection be employed. Further, since the contacts are adjacent the circuit breaker trip unit, the heat generated at the contacts will be transmitted to its thermal trip element thereby serving to adversely effect the calibration accuracy of the thermal trip.

To adapt the coordinated circuit breaker and current limiting fuse assembly to high current applications, it has become the practice to provide a bolted connection intermediate the fuse terminals and the circuit breaker housing terminals. However, because of the inaccessibility of the region wherein such bolted connections must be made, severe difficulties have been presented with respect to providing access to the bolted connection. One such manner of providing access is shown in U.S. Patent No. 3,043,934, issued July 10, 1962 in the name of August Bodenschatz, entitled, "Bolted Connection for Current Limiting Fuses," and assigned to the assignee of the instant invention. That patent shows removable first and second portions of the circuit breaker housing cover adjacent the area where the bolted connections are to be made. This arrangement disadvantageously requires the modification of the circuit breaker housing itself, and the actual removal of portions thereof, in order to provide access to the bolted terminals.

Other arrangements have also been proposed whereby the current limiting fuses are directly secured to bolted terminals at the extended base region of the circuit breaker housing, without there being a separate fuse housing. Still other arrangements provide access to only one of the fuse terminals for a bolt connection thereof, while the other fuse terminal is still of the quick releasable variety. Disadvantageously, in this latter arrangement the quick releasable connection has been retained at the fuse terminal adjacent the circuit breaker trip unit.

These arrangements have proven less than completely satisfactory in failing to provide the advantages of a separate fuse housing with access to the fuse terminals being provided through such fuse housing, while connected to the circuit breaker housing.

Our invention advantageously provides an arrangement whereby a movable member of the current limiting fuse housing may be easily disposed between a first position and a second position, with its location in the former corresponding to normal operation of the device, and its location in the latter providing external access to all of the bolted connections. Such external access provides a passageway suitable for the insertion of a bolt tightening tool, such as a screwdriver. The movable member, which we show typically as the cover of the fuse housing, is suitably interlocked such that the circuit breaker automatically trips responsive to the movement thereof to its second position, during which time external access is provided to the bolt connected terminals.

In one form of our invention the cover of the current limiting fuse housing is pivotally hinged to the main body portion of the fuse housing, such that it need merely be lifted up to the afore-designated second position to provide the access to the bolted terminal connections. The interlock is provided by a spring biased member bearing against the under-surface of the cover, such that upon lifting up of the cover to expose the bolted terminals, said spring biased member will be released to thereby effect tripping of the circuit breaker contacts.

In another embodiment of our invention, the cover is slidably mounted to the main body portion of the fuse housing by virtue of fasteners passing through elongated slots within the fuse housing cover. The slidable cover contains apertures which when in registry with corresponding access means through the main body portion of the fuse housing provide externally accessible passages thereto. In this embodiment the interlock is similarly provided by a spring biased member which cooperates with a depending cam formation of the slidable cover. Upon movement of the cover to its second position, whereby the external access to the fuse terminals is provided, the circuit breaker will automatically be tripped.

In still another embodiment of our invention, access to the bolted terminals is provided by the removal itself of the fuse housing cover, with the main body portion of the fuse housing and the current limiting fuses still being connected to the base extension portion of the circuit breaker housing. The interlock is similarly provided by a spring biased member which cooperates with the auxiliary tripper bar of the current limiting fuse housing to automatically trip the circuit breaker responsive to the removal of the cover.

As another preferable aspect of my invention one or more of the bolt connecting members may have an extended portion projecting upwards towards the movable cover member of the current limiting fuse housing. The length thereof is selected such that it will interfere with the movement back of the cover to its first, or normal operating, position unless the bolt member is sufficiently tightened into the terminals to be connected. Hence, this arrangement guarantees a tight mechanical connection of the bolt, thereby insuring minimum contact resistance.

It is therefore seen that the basic concept of our invention resides in providing a novel external access means to the bolt connected terminal area of a current limiting fuse housing. Namely a simple movement of the fuse housing cover itself provides such access, while providing suitable interlock relationship between such movement, and the operation of the circuit breaker contacts.

Accordingly, a primary object of our invention is to provide improved access means for the bolted terminal connection between a series connected circuit breaker and current limiting fuse.

Another object of this invention is to provide for the bolted connection of a current limiting fuse and circuit breaker, wherein the current limiting fuse is contained within a separate housing connectible to the circuit breaker housing and improved access means are provided to the region of the bolt connections.

A further object of our invention is to provide such an arrangement whereby the improved access means include the cover portion of the current limiting fuse housing, movable from its normal overlying relationship to provide such access, and suitably interlocked to disengage the circuit breaker contacts responsive to such movement.

An additional object of our invention is to provide a current limiting fuse housing containing interlocked access means for providing external access to the fuse terminals in a manner permitting the insertion of a bolt tightening tool.

Still another object of our invention is to provide a current limiting fuse housing having a hinged cover movable to provide access to the fuse terminals while the current limiting fuse housing is connected to its cooperating circuit breaker housing.

Still a further object of our invention is to provide a current limiting fuse housing having a slidable cover movable to a position providing access to its fuse terminals while the current limiting fuse housing is connected to its cooperating circuit breaker housing.

These as well as other objects of our invention will readily become apparent upon a consideration of the following drawings in which:

FIGURE 3 is a side cross-sectional view of the combined circuit breaker and current limiting fuse assembly of FIGURE 1, when taken through one phase thereof.

FIGURE 5 is a partial cross-sectional view taken through the top portion of the current limiting fuse housing showing the manner in which the pivotally mounted cover thereof is coordinated with the cooperating interlock.

FIGURE 6 is a cross-sectional view illustrating the operation of our novel interlock mechanism, where its normal position is shown in solid line and its trip position is shown dotted.

FIGURE 7 is a simplified perspective view showing a further embodiment of our invention whereby a slidable cover is provided on the current limiting fuse housing.

FIGURE 8 is a cross-sectional view taken along line 8—8 of FIGURE 7 and looking in the direction of the arrows, showing the manner in which the slidable cover thereof is interlock coordinated.

FIGURE 9 is a partial cross-sectional view corresponding to the right-hand region of FIGURE 3, but showing a still further embodiment of our invention, whereby the cover of the current limiting fuse housing is removed to provide access to the bolt connections.

Figure 1:
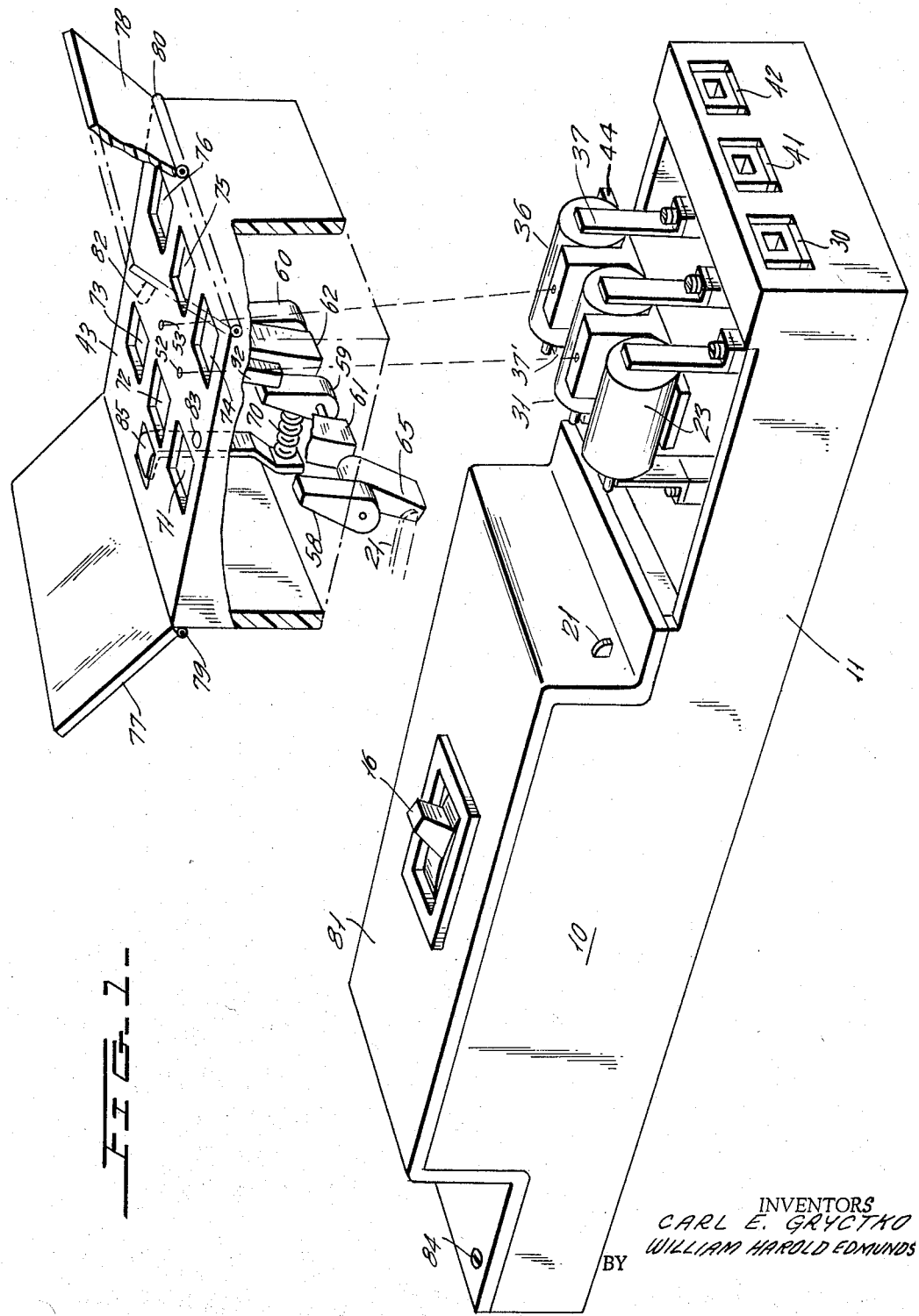
FIGURE 1 shows a partially exploded perspective view of the series connected circuit breaker housing and fuse housing, according to a first embodiment of our invention.
Figure 2:
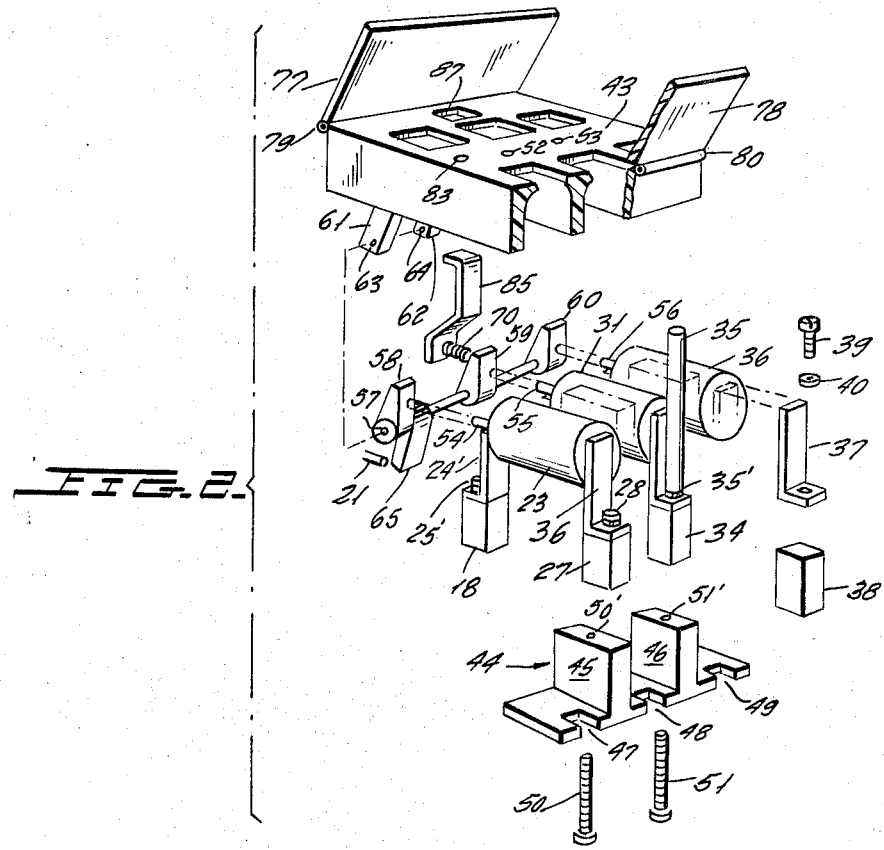
FIGURE 2 shows an exploded perspective view of the fuse housing of FIGURE 1 and the fuses contained therein.

Referring first to FIGURES 1–3, we have shown a circuit breaker in a first housing 10 that has an extended base 11, in much the same manner as described in above-mentioned U.S. Patent No. 3,043,934. A cover 81 is secured thereto by any appropriate means.

As best seen in FIGURE 3, the circuit breaker is comprised of a first terminal 12 which is electrically connected to a stationary contact 13. A movable contact 14 is movable into and out of engagement with contact 13 in the usual manner and under the influence of an operating mechanism of any desired type 15. The operating mechanism 15, in the usual manner, is manually operated by an operating handle 16 which extends through the top of the circuit breaker housing 10 to afford manual access thereto.

The current path then extends to the movable contact 14, as by the use of a pigtail or any other desired connecting means, to the trip unit 17, which contains various trip elements such as for example; a thermal means, which could use a bimetal; and a magnetic trip means, which could include a solenoid operated mechanism. The electrical connection then extends to a circuit breaker terminal, such as terminal 18.

It will be apparent to those skilled in the art that FIGURE 3 shows only one phase, with the same electrical path identified above for the circuit breaker being duplicated in each of the other phases of the multiphase unit.

The trip elements contained in trip housing 17 work in conjunction with the operating mechanism 15 to cause operation of the movable contact 14 under various types of electrical fault conditions. By way of example, when there is a light overload for a predetermined length of time, the thermal trip means, which might typically include a bimetallic element, would be effective to move a latch schematically illustrated as latch 19 in trip unit 17 of FIGURE 3 to cause operation of the trip unit. In an analogous manner energization of the magnetic trip means, which might typically include solenoid 20, would also be translated to latch mechanism 19 to cause subsequent operation of movable contact 14 under relatively low short circuit conditions.

In accordance with the presently accepted concepts of the electrical and mechanical coordination of circuit breakers and current limiting fuses, a still further means for opening the circuit breaker contact is provided by way of a signal delivered by a current limiting fuse 31 in series with the circuit breaker. When the current limiting fuse operates under a severe fault condition, a mechanical signal is delivered to a trip link 21, which extends from trip unit 17, and is appropriately connected to the latch mechanism included in operating mechanism 15. For further details of the manner in which this is accomplished, reference is made to aforementioned U.S. Patent No. 2,924,688.

It is sufficient for purposes of understanding the instant invention to realize that trip link 21 is normally biased outward by a biasing spring 22, so that the tip of link 21 extends from the trip mechanism 17 towards the space reserved for the current limiting fuse housing, as shown in FIGURE 1. So long as the outward motion of link 21 (to the right as shown in these figures) is restricted in some manner, automatic tripping response to the fuse assembly will not be achieved. It is only when link 21 is permitted to move to the right under the influence of spring 22 that automatic tripping of the circuit breaker will be effected responsive to the happening of a trip causing event being transmitted from the current limiting fuse housing, as will be hereinafter discussed in further detail.

Returning now to the electrical path through the phase shown in FIGURE 3, the current limiting fuse 31 has an extended terminal 24' which is bolted to current breaker output terminal 18' by the bolt 25'. The path is then continued to the fuse element within current limiting fuse 31 to its opposite terminal 33 which is similarly bolt connected to another terminal 34 by a bolt 35. Terminal 34 as well as terminal 18', is carried by the extended base region 11 of circuit breaker housing 10. The electrical path then extends from terminal 34 through conductor strap 29 to the circuit breaker terminal 41 of the phase illustratively shown in FIGURE 3.

Each of the remaining circuit breaker phases are terminated by fuses bolted thereto in the same manner as shown with respect to the fuse 31 and terminals 18' and 34 in FIGURE 3. Thus, in FIGURES 1 and 2 the first phase includes a fuse 23 which has extending terminals 24 and 26 which are bolted to circuit breaker terminals 18 and 27, by bolts 25 and 28, respectfully. The third phase includes current limiting fuse 36, which has conductors 37, 37' extending downwardly to terminal 38 and another terminal not shown, within the extended circuit breaker phase. Fuse conductor 37 is bolt connected to terminal 38 as by bolt 39, and if desired a pressure washer 40 (it being understood that each of the bolt connections may likewise have a pressure washer 40).

It will be noted that the ultimate circuit breaker terminals for the last two phases considered include terminals 30, 42, whereby circuit breaker terminals 30, 41 and 42 represent one set of terminals for the three phase circuit interrupter. A similar set of three terminals are provided at the other end of the interrupter, such as terminal 12 shown in FIGURE 3.

As previously described it is desirable that each of the fuses 23, 31 and 36 be contained within a housing which is separate and removable from the circuit breaker housing 10. The current limiting fuse housing includes a main body portion 43 which has channels in the lower region thereof conforming to the location of fuses 23, 31 and 36, such that said fuses are appropriately received and securably positioned within main housing body portion 43.

The individual fuses are then retained with respect to housing body 43 by a retaining bar 44 which has two extending sections 45, 46 projecting upward between fuses 23 and 31, and 31 and 36 respectively. In addition, to further secure the fuses, retaining bar 44 is provided with notches 47, 48 and 49 which register with downwardly extending terminals 26, 33 and 37 of fuses 23, 31 and 36 respectively. The retaining bar 44 is rigidly held in position by bolts 50, 51 which extend through cooperating openings 50', 51' of protrusions 45, 46, respectively, and register with openings 52, 53 in the body portion 43.

As previously mentioned, it is necessary that the fuses 23, 31, 36 deliver some direct signal or indication to trip unit 17 response to their operation. This signal is then transmitted to operating mechanism 15, so that the operating mechanism will cause the opening of all the phases of the circuit breaker contacts when any one fuse operates. To accomplish this each of the fuses are provided with a conventional type of striker pin, such as striker pins 54, 55 and 56, for fuses 23, 31 and 36 respectively. The striker pins are constructed in the well known manner whereby they will be forcefully and rapidly ejected responsive to operation of their respective fuse members.

An auxiliary tripper bar 57 is provided with projections 58, 59 and 60, which are in registry with striker pins 54, 55 and 56, respectively, so that the auxiliary tripper bar will be rotated counter-clockwise, as shown in these figures, when any of the striker pins 54, 55 or 56 is rejected. The auxiliary tripper bar 57 is shown carried from downwardly projecting legs 61 and 62 of housing 43. Legs 61 and 62 have apertures 63 and 64 respectively for receiving tripper bar 57 in the manner best shown in FIGURES 1 and 2.

Tripper bar 57 carries a further lower extending member 65 which is normally biased in a clockwise direction by spring 70 of our novel interlock arrangement, the operation of which will be subsequently discussed in further detail.

The tripper bar extension 65 engages the extending portion of trip link 21. The biasing means 70, which biases element 65 clockwise is arranged to be stronger than spring 22 which biases trip link 21 to the right. Hence, trip link 21 will normally be held in its inactive position to the left. When, however, one of the fuse striker pin 54, 55 or 56 are ejected auxiliary trip bar 57 will be rotated counter-clockwise against spring 70 and thus permit trip link 21 to move to the right under its biasing spring 22, to thereby cause automatic circuit breaker tripping.

In providing a bolted connection between the terminals of fuses 23, 31, 36 and their respective circuit breaker phases, it has been found feasible to use the coordinated circuit interrupter for high current ratings. That is, since the connection between the circuit breaker terminal 18 and fuse terminal 24 is adjacent the trip unit 17, the heat generated under high current conditions should a tulip type contact be used has made it substantially impossible to maintain accurate calibration of the thermal trip element contained within trip unit 17. By using a bolted connection, as shown in FIGURES 1, 2 and 3, the contact resistance is substantially decreased and thus the heat generated at the connection between the fuses and circuit breaker is correspondingly decreased to a point at which it will exert very little influence on the trip unit calibration.

The problem, however, has been to provide external access to the bolt terminals while the main body portion 43 of the current limiting fuse housing and its current limiting fuse members 23, 31, 36 are connected to the base extension 11. More specifically, the bolted connections are seen to be at regions normally enclosed by the volume defined by the current limiting fuse housing. Hence, external access means must be provided for the reception of a bolt tightening tool, such as the shank of a conventional type of screw driver, without requiring disassembly of the unit.

In accordance with the present invention, we have found it advantageous to provide passageways or access means such as 71, 72, 73 and 74, 75, 76 extending through the main body portion 43 of the current limiting fuse housing, with such access means being in registry with the location of the bolt connections to be made to the terminals to be connected. During the normal operation of the circuit interrupter unit, it is imperative that the access means be covered so as to prevent contact with the engaged terminals. Further, upon providing such access to the terminals the circuit breaker must be automatically tripped to insure that the unit is disconnected during servicing thereof.

In accordance with the embodiment of my invention, as shown in FIGURES 1–3, a hinged cover shown comprising two sections 77, 78 is shown pivotally mounting to housing body 43, as by spring biased hinges 79, 80 along opposed edges of the top surface of main body portion 43. The hinges are of a conventional variety constructed to bias their cover sections downward to their closed position, as shown in FIGURE 3. During the normal operating condition of the circuit interrupter assembly, covers 77, 78 will be closed to lie in an overlying relationship over the top surface of main body portion 43, as shown in FIGURE 3. Hence, the access means 71–76 will be covered thereby. It will be noted in this respect that cover 78 may include a downwardly extending peg 82 which fits into depression 83 of housing body 43 to insure proper closing of the cover members 77, 78 as best shown in FIGURE 5. Also, a single cover member may be employed over the top surface of main housing portion 43 as an alternative to the dual covers 77, 78 shown in these figures.

The connecting bolts, such as 35, may be of an extended length, with the lower end 35′ thereof being threaded for bolt fastening of terminals 26, 27, while the upper end 35″ thereof will project upward into the plane of cover member 78 should bolt 35 not be sufficiently tightened. That is, by so extending the length of the bolts in cooperation with the movable cover of our invention, we provide a visual observation as to whether the bolts are properly tightened. Hence, a minimization of contact resistance is insured, to further enhance the high current operation of the coordinating circuit breaker and current limiting fuse assembly.

Figure 4:
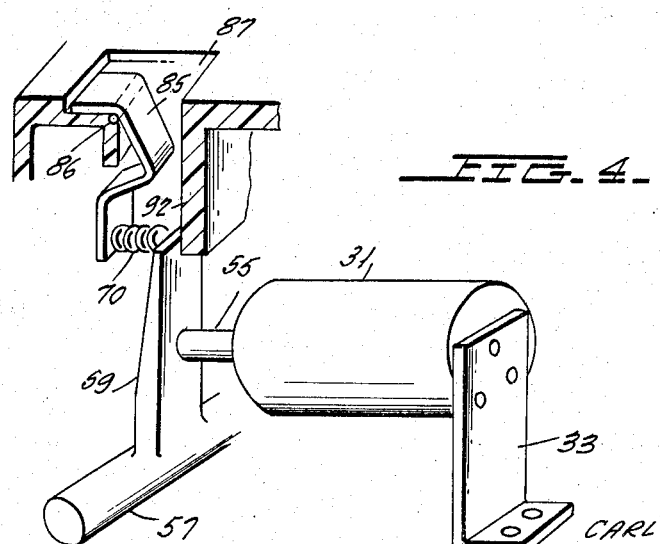
FIGURE 4 is a perspective view illustrating the novel interlock arrangement responsive to movement of the access means.

To provide for automatic tripping of the circuit breaker responsive to the openings of covers 77, 78, interlock lever member 85 is pivotally mounted, as by pin 86 within depression 87 provided in housing body 43. Spring 70 interconnects the lower offset portion 88 of interlock lever 85 to an extension of the tripper bar, such as extension 59. The spring 70 is retained as by centering projections 89, 91 respectively. Spring 70 is of the compression variety and with interlock lever 85 maintained as shown in FIGURE 4 urges the uppermost portion of extension 59 against retaining offset 92 of housing body 43. With extension 59 so abutting housing offset 92, spring 70 will tend to pivot interlock lever 85 about pivot 86 to its dotted position, as shown in FIGURE 6. However, with the cover members 77, 78 closed, the upper surface 93 of the interlock lever will bear against the lower surface of the cover, with the cover thereby preventing such rotation. Hence, the interlock lever 85 will normally be in the non-tripped position, as best shown in FIGURE 4, with it being maintained in that position by the underside of the cover.

The operation of the interlock responsive to the opening of cover members 77, 78 is as follows. With the cover members moved from their overlying relationship such that they no longer abut surface 93 of interlock lever 85, the interlock lever 85 is then free to pivot to the dotted position shown in FIGURE 6. This releases the non-tripped biasing of auxiliary tripper bar 57 afforded by spring 70, permitting the movement outward of trip link 21 under the influence of its biasing spring 22. It will be noted that this is a positive mechanical action immediately responsive to the opening of the first cover member 77 to expose the access means 71–73.

Reference is now made to FIGURES 7 and 8 which show the basic operation of a somewhat modified embodiment of our invention. This arrangement departs from the above discussed, only in the manner in which the fuse housing cover, shown as 94, is mounted to the main body portion 43 of the fuse housing. That is, whereas FIGURES 1–3 show the lever pivotally hinged to the main body portion 43, the cover 94 of this embodiment is slidably mounted to main body portion 43 by virtue of elongated slots 96, 97 and securing means such as fastening screws 98, 99 respectively. The cover 94 includes aperture means 71′, 72′, 73′, 74′, 75′ and 76′ respectively, which in the normal operating position, as shown in FIGURE 7, will overly a solid portion of fuse housing body portion 43, thereby blocking the access to the connecting terminals. Should it be desired to provide external access to the connecting bolts of the fuse terminals, it is merely necessary to slide cover 94 with respect to main housing body portion 43 to the left as shown in FIGURE 7 to a position whereby the respective aperture means 71′–76′ will be in registry with their corresponding access means 71–76, the latter longitudinally extending through the fuse housing body 43 to the location of their respective connecting bolts.

To provide for tripping of the circuit breaker contacts corresponding to movement of the fuse housing cover 95 to the left, an interlock arrangement similar to that discussed above may be employed. Interlock lever 85 is now operatively responsive to a depending cam surface 95 of cover 94. With the cover in the operating position as shown in FIGURE 7, cam surface 95 will abut the top of interlock lever 85. When cover 94 is slidably moved to the left, as shown by the arrow of FIGURE 8, cam member 95 will be moved to its dotted position, such that lever 85 will now be free to rotate to a position corresponding to the dotted position of FIGURE 6, thereby releasing the biasing force of spring 70, to permit the tripper bar 57 to rotate counterclockwise, with trip link 21 then being moved to the right.

Still another embodiment of our invention is shown in FIGURE 9, which generally corresponds to the right-hand portion of FIGURE 3, and wherein like numerals indicate like components. In this arrangement, the cover 100 of the current limiting fuse housing is removed as by connecting screws 101, 102 from main housing portion 43 to provide the requisite access to the bolted terminals, such as 25, 35 of the phase shown. The interlock trip lever 85′ is pivotally mounted to a trip lever bearing member 103, with said latter member being fixedly secured as by L-shaped sections 104, 105 in recess 106. Hence, removal of the cover portion 100 will permit clockwise rotation of interlock lever 85′ about bearing member 103, thereby releasing the bias afforded by spring 70′ with respect to auxiliary tripper bar 57, thereby permitting movement of the trip link 21 to the right under the influence of its biasing spring 22.

Hence, it is noted that in accordance with our invention, access to the connecting bolts is afforded in an extremely simplified manner merely by moving a member, such as the cover of the current limiting fuse housing, from its normal, or first, position to a second position, with such movement being accompanied by automatic tripping of the circuit breaker as provided by a novel interlock arrangement. It will be noted that should the fuse housing itself be removed, trip link 21 will be free to move to the right, thereby tripping the circuit breaker contacts. Further, in accordance with the conventional operation of such a trip link member, the circuit breaker will be prevented from moving to the closed position unless the current limiting fuse housing is properly connected and the bolt terminal access means appropriately covered.

In the foregoing disclosure the instant invention has been described in accordance with preferred embodiments. However, many variations and modifications will now become apparent to those skilled in the art, and therefore it is preferred that the present invention be limited not by the specific disclosure herein contained, but only by the appended claims.

The embodiments of the invention in which an exclusive privilege or property is claimed are defined as follows.

1. In combination: a fuse and a circuit breaker; said circuit breaker being contained in a first housing; said fuse being contained in a second housing; fastening means securing said fuse to said second housing such that said second housing carries said fuse as an integral unit; said first housing including means for mounting thereto said second housing, including said fuse, as an integral unit; said fuse having a first and second terminal; said first housing having a first and second terminal for electrically receiving said first and second terminals of said fuse respectively, to electrically connect said current limiting fuse in series with said circuit breaker; said first terminal of said first housing electrically connected to said circuit breaker; a first and second bolt means; said first bolt means electrically connecting said first fuse terminal to said first terminal of said first housing; said second bolt means electrically connecting said second fuse terminal to said second terminal of said first housing; said first and second bolt means also serving to fasten said second housing to said first housing; said second housing including an exterior housing portion overlying the area including said bolted connections of said terminals; said second housing including access means externally communicating with said bolted connections, for permitting the insertion of a bolt tightening tool; said second housing exterior housing portion having a member movable between a first and second position while said second housing is mounted to said first housing; said member when in said first position blocking the external communication of said access means; said member when in said second position allowing the external communication of said access means, whereby the movement of said member from said first to second positions provides external access for the insertion of a bolt tightening tool.

2. In combination: a fuse and a circuit breaker as set forth in claim 1; said second housing including a main body and a cover therefor; said member comprising said cover; means pivoting said cover to said main body portion of said second housing; said first position corresponding to said cover overlying said main body portion, and said second position corresponding to said cover being pivotally rotated away from said overlying relationship.

3. In combination: a fuse and a circuit breaker as set forth in claim 1; said second housing including a main body portion and a cover thereof; said member comprising said cover; means slidably mounting said cover along said main body portion; said cover having aperture means; said cover when in said first position providing a non-registry relationship of said access means and said aperture means; said cover when in said second position providing a registry relationship of said access means and aperture means.

4. In combination: a fuse and a circuit breaker as set forth in claim 1; said second housing including a main body portion and a cover therefor; said member comprising said cover; said first position corresponding to said cover being fastened to said main body portion; said second position corresponding to said cover being lifted away from said main body portion, with said main body portion still being connected to said first housing.

5. In combination: a fuse and a circuit breaker as set forth in claim 1, further including; interlock means; said interlock means being connected between said second housing and said circuit breaker; said interlock means opening said circuit breaker responsive to said second housing being removed from said first housing or said member being in said second position, whereby said interlock means prevents the closing of said circuit breaker unless said second housing is in position with respect to said first housing and said member is in said first position.

6. In combination: a fuse and a circuit breaker as set forth in claim 1; at least one of said bolt means having an extended section; a first end of said extended section located at its respective bolted terminal, and the opposed end of said extended section projecting upwards, through said access means, towards said member; said extended section of predetermined length such that said opposed end interfering with the movement of said member to said first position unless its said first end is sufficiently tightened into its respective fuse and first housing terminals.

7. A multiphase circuit interrupter comprising the series connection of a multiphase circuit breaker and a respective current limiting fuse for each phase of said multiphase circuit breaker; said multiphase circuit breaker having a pair of cooperable contacts for each respective phase and a trip unit for controlling the operation of said cooperable contacts between an engaged and disengaged position; said multiphase circuit breaker being contained within a first housing; all of said current limiting fuses being contained within a second housing; fastening means securing said fuses to said second housing such that said second housing carries said fuses as an integral unit; said first housing including means for mounting thereto said second housing, including said fuses, as an integral unit; each of said fuses having a first and second terminal; said first housing having a first and second terminal for each of said phases; bolt means for electrically and mechanically connecting said first and second fuse terminals to their respective first and second terminals of said first housing; said bolt means also serving to fasten said second housing to said first housing; said second housing including an exterior housing portion overlying the area including said bolted connections of said terminals; said second housing including access means externally communicating with said bolted connections, for permitting the insertion of a bolt tightening tool; said second housing exterior housing portion having a member movable between a first and second position while said second housing is mounted to said first housing; said member when in said first position blocking the external communication of said access means; said member when in said second position allowing the external communication of said access means, whereby the movement of said member from said first to second positions provides external access for the insertion of a bolt tightening tool.

8. A multiphase circuit interrupter as set forth in claim 7; said second housing including a main body and a cover therefor; said member comprising said cover; interlock means; said interlock means being connected between said second housing and said multiphase circuit breaker; said interlock means opening said multiphase circuit breaker responsive to said second housing being removed from said first housing or said member being in said second position, whereby said interlock means prevents the closing of said multiphase circuit breaker unless said second housing is in position with respect to said first housing and said member is in said first position; a trip bar; said interlock means including a first member in engagement with said cover, and a biasing means; said cover when in said first position maintaining said first member in a first position, to urge said biasing means in a direction acting to maintain a non-tripped position of said trip bar; said cover when in said second position releasing said first member from said first position to a second position; the relocation of said first member to said second position releasing said biasing means; means automatically moving said trip bar to its tripped position responsive to the release of said biasing means.

9. A multiphase circuit interrupter as set forth in claim 8; at least one of said bolt means having an extended section; a first end of said extended section located at its respective bolted terminal; and the opposed end of said extended section projecting upwards, through said access means, towards said cover; said extended section of predetermined length such that said opposed end interfering with the movement of said cover to said first position unless its said first end is sufficiently tightened into its respective fuse and first housing terminals.

10. A multiphase circuit interrupter as set forth in claim 8, wherein means pivotally connect said cover to said main body portion of said second housing; said first position corresponding to said cover overlying said main body portion, and said second position corresponding to said cover being pivotally rotated away from said overlying relationship.

11. A multiphase circuit interrupter as set forth in claim 8, wherein means slidably maintaining said cover along said main body portion; said cover having aperture means; said cover when in said first position providing a non-registry relationship of said access means and said aperture means; said cover when in said second position providing a registry relationship of said access means and aperture means.

12. A multiphase circuit interrupter as set forth in claim 8, wherein said first position corresponding to said cover being fastened to said main body portion; said second position corresponding to said cover being lifted away from said main body portion, with said main body portion still being connected to said first housing.

13. A current limiting fuse housing adapted to be removably bolted to a circuit breaker base; said fuse housing carrying a plurality of current limiting fuses; each of said current limiting fuses having a pair of bolt receiving terminals adapted for bolted connection to a circuit breaker base; a striker pin ejectable therefrom responsive to operation of any of said current limiting fuses; an auxiliary tripper bar; said auxiliary tripper bar being carried by said current limiting fuse housing and being rotatable with respect to said housing; said auxiliary tripper bar having a plurality of extensions, each aligned with the said striker pin of a respective current limiting fuse whereby said auxiliary tripper bar is rotated in a first direction by the ejected striker pin of any of said current limiting fuses when any of said current limiting fuses are operated; a cover enclosing a substantial portion of the volume defined by said fuse housing, including the location of said bolt receiving terminals; said fuse housing, current limiting fuses, tripper bar and cover defining an integral assembly; said cover movable between a first and second position relative to said fuse housing; said cover when in said second position providing external access to said bolt receiving terminals of said fuses carried internally of said fuse housing; and when in said first position blocking said external access; an interlock member carried by said fuse housing; said interlock member in engagement with said cover; a biasing means interconnecting said interlock member to an extension of said trip bar; said cover when in said first position maintaining said interlock member in a first position, to urge said biasing means in a direction opposed to rotation of said tripper bar in said first direction; said cover when in said second position releasing said biasing means to permit rotation of said tripper bar in said first direction.

References Cited by the Examiner

UNITED STATES PATENTS

| 2,018,298 | 10/1935 | Cole | 174—57 |
| 3,009,035 | 11/1961 | Reichert et al. | |
| 3,043,934 | 7/1962 | Bodenschatz | 200—116 X |
| 3,113,193 | 12/1963 | Jacobs | 200—133 |

FOREIGN PATENTS

| 636,821 | 5/1950 | Great Britain. |

OTHER REFERENCES

American Standard Definitions of Electrical Terms, 1941, New York, American Institute of Electrical Engineers, page 98, sections 20.50275 and 20.50280.

BERNARD A. GILHEANY, *Primary Examiner.*

H. GILSON, *Assistant Examiner.*